United States Patent

[11] 3,630,189

| [72] | Inventors | Ralph R. Hodges;<br>Adrian F. Bauer, both of Belleville, Ill. |
|---|---|---|
| [21] | Appl. No. | 15,769 |
| [22] | Filed | Mar. 2, 1970 |
| [45] | Patented | Dec. 28, 1971 |
| [73] | Assignee | Empire Stove Company<br>Belleville, Ill. |

[54] STOVE
8 Claims, 8 Drawing Figs.

[52] U.S. Cl. ..................................................... 126/41 R
[51] Int. Cl. ..................................................... A47j 37/00,
F24c 3/00
[50] Field of Search ......................................... 126/41, 38,
37, 39, 25, 25 A, 9

[56] References Cited
UNITED STATES PATENTS
1,496,344 6/1924 Levinson ..................... 126/38
3,289,801 12/1966 Jerkins ......................... 126/41 X
3,396,716 8/1968 Weyland et al. ............. 126/41

*Primary Examiner*—Charles J. Myhre
*Attorney*—Gravely, Lieder & Woodruff

ABSTRACT: A stove includes a cabinet having a grill extending across its upper end and burners below the grill. The burners are supplied with a combustible gas through a supply conduit having a solenoid shutoff valve and adjustable control valves thereon. The solenoid valve is energized by a battery and a coin-operated timer switch is interposed between the battery and the coil of the solenoid valve. The cabinet has a removable access panel which provides access to the various components in the interior thereof. The grill is mounted in slideways, and its end is normally blocked by the access panel. However, when the access panel is removed, the grill can be withdrawn from the cabinet. A grease tray is mounted within the cabinet beneath the grill and burners, and that tray slopes downwardly toward the access panel and terminates at a discharge spout which projects through the access panel.

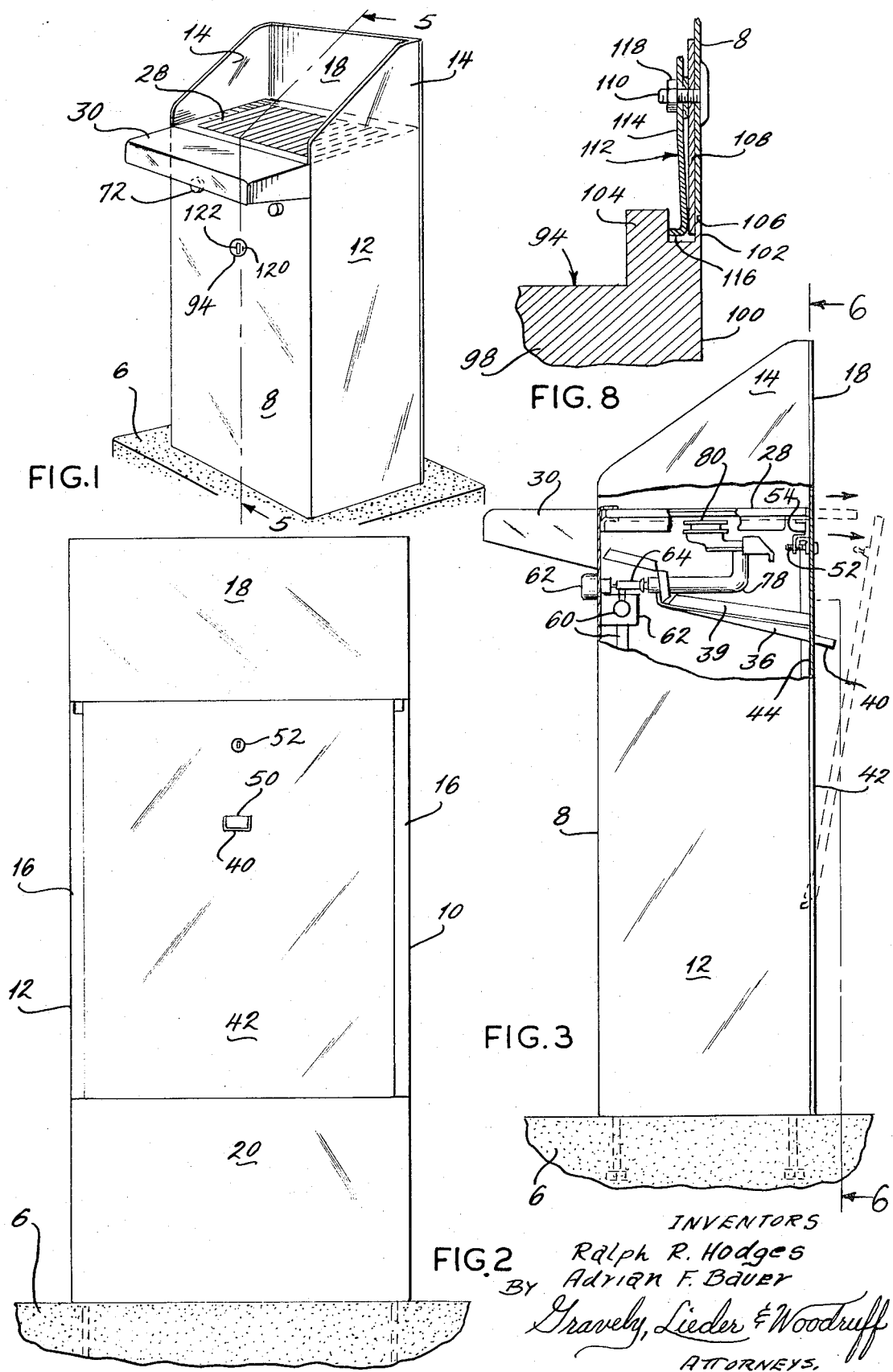

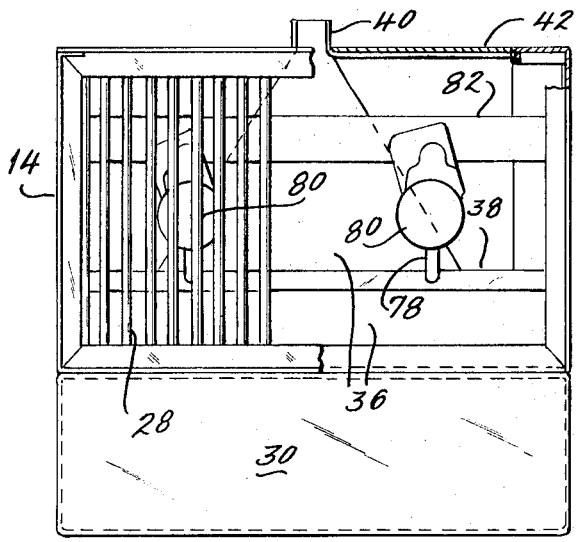
FIG.4
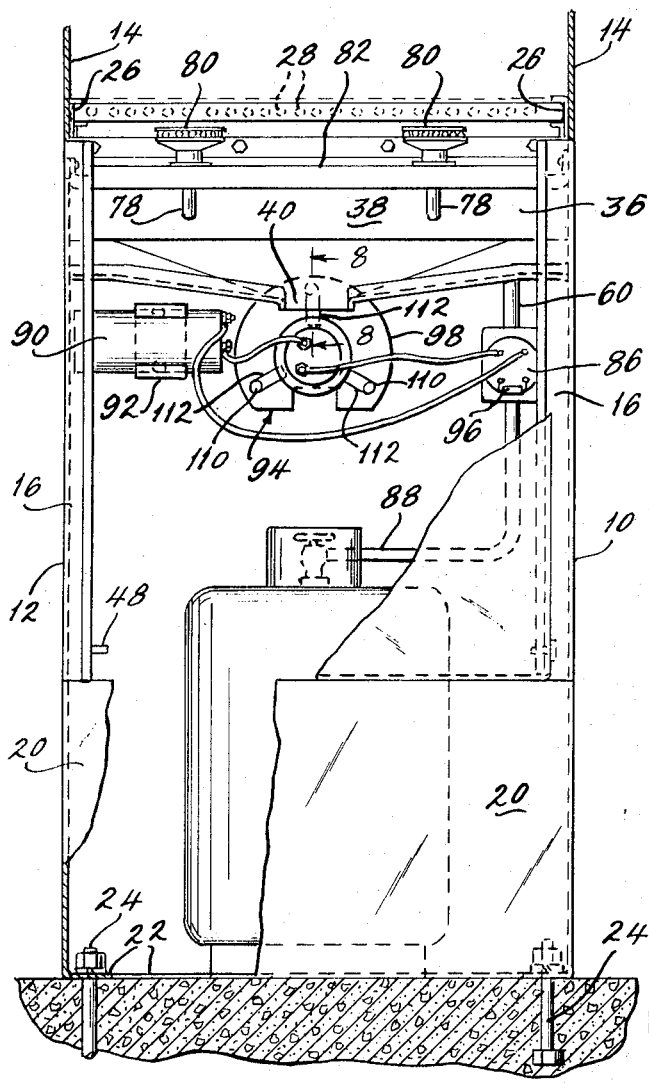
FIG.6
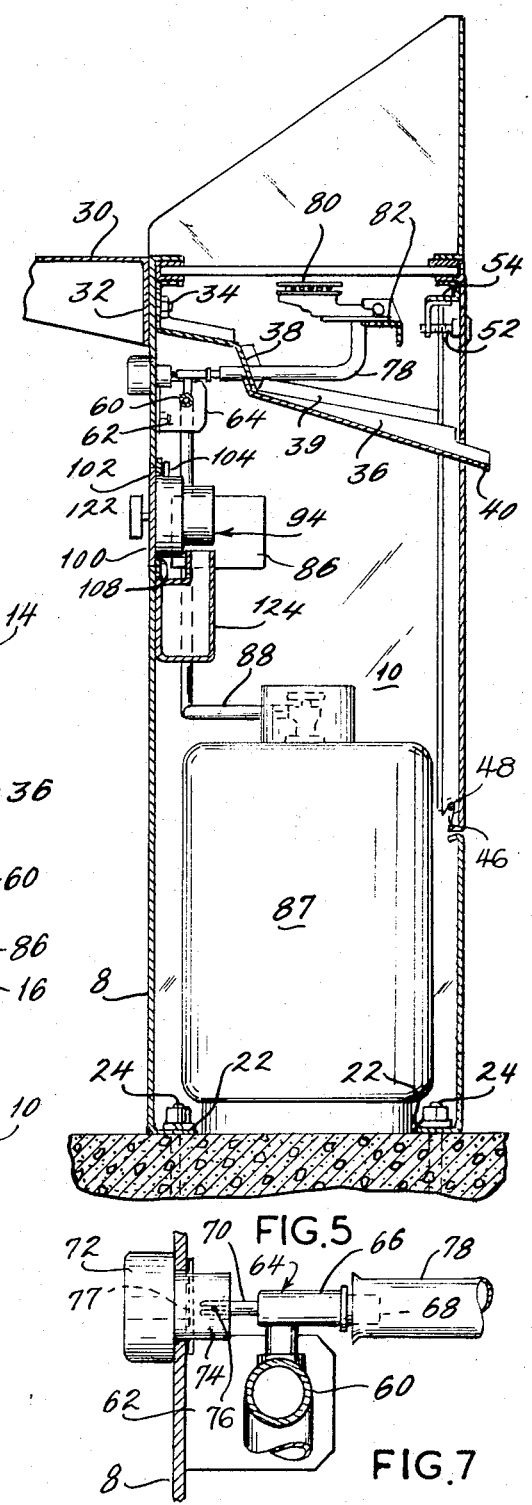
FIG.5
FIG.7

STOVE

BACKGROUND OF THE INVENTION

This invention relates in general to heating devices and, more particularly, to a stove for preparing foods outdoors.

Many campsites and picnic grounds in recreational areas throughout the country are provided with a limited number of barbecue grills and pits, but these are fired generally by either firewood available at the recreational facility or charcoal supplied by the user. With the expanding population and the increased popularity of camping, firewood has become difficult to procure without incurring prohibitive costs. Charcoal, on the other hand, is a nuisance to carry and handle due to its extremely dirty nature and the quantity of fines always associated with it. Furthermore, both firewood and charcoal are difficult to light, each normally requiring some more combustible substance such as paper, kindling, or lighter fluid to bring it to its kindling temperature.

Some campers and picnickers in order to avoid the problems associated with permanent outdoor grills and pits have purchased portable camp stoves which are fired by gasoline. These stoves, however, are rather expensive and furthermore are a nuisance to transport and handle.

SUMMARY OF THE INVENTION

One of the principal objects of the present invention is to provide an outdoor stove for preparing foods at permanent campsites and picnic areas. Another object is to provide a stove of the type stated which accepts coins and supplies a combustible gas to burners for a limited amount of time which is dependent on the amount of coin introduced into the stove. A further object is to provide a stove of the type stated which can be left unattended outdoors during periods of nonuse. An additional object is to provide a stove of the type stated which is simple in construction, easy to operate, and easily serviced and cleaned. Still another object is to provide a stove of the type stated which is not adversely affected by winds. These and other objects and advantages will become apparent hereinafter.

The present invention is embodied in a stove having features which make it ideally suited for permanent outdoor installations such as at campsites and in picnic grounds. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a perspective view of a stove constructed in accordance with and embodying the present invention;

FIG. 2 is a rear elevational view of the stove;

FIG. 3 is a side elevational view, partially broken away and in section, of the stove;

FIG. 4 is a top plan view of the stove;

FIG. 5 is a sectional view taken along line 5—5 of FIG. 1;

FIG. 6 is a sectional view looking into the back of the stove;

FIG. 7 is an enlarged fragmentary sectional view showing one of the control valves for the stove; and FIG. 8 is a sectional view taken along line 8—8 of FIG. 6.

DETAILED DESCRIPTION

Referring now to the drawings, 2 designates an outdoor stove including a cabinet 4 which preferably rests upon and is bolted to a concrete pad 6. The stove 2 is fueled by a combustible gas which is supplied to the burners through a supply conduit having a coin operated shutoff valve mechanism in it as will subsequently be described in greater detail.

The cabinet 4 includes a front wall 8 and a pair of sidewalls 10 and 12 which are preferably formed from a single sheet of metal. The sidewalls 10 and 12 project above the upper margin of the front wall 8 in the formation of triangular wind screens 14. The rear ends of the sidewalls 10 and 12 are turned inwardly to form flanges 16 (FIG. 6), and connected across the flanges 16 at the triangular wind screens 14 is a rear wind screen 18. The lower ends of the sidewalls 10 and 12 are connected by a bottom panel 20 which is also attached to the flanges 16. The front wall 8, the sidewalls 10 and 12, and the bottom panel 20 at their bottom margins merge into integrally formed mounting flanges 22 (FIGS. 5 and 6) which turn inwardly into the interior of the cabinet 4 and rest upon the pad 6. In this connection, the pad 6 has bolts 24 embedded in it, and these bolts project upwardly through the mounting flanges 22 and engage nuts which fasten the cabinet 4 against the pad 6. Since the flanges 22 turn inwardly access to the bolts 24 and nuts thereon cannot be gained without going through the interior of the cabinet 4.

Welded to the inner surfaces of each sidewalls 10 and 12 along the bottom of the triangular wind screen 14 thereon are a pair of angles which are arranged one on top of the other to form an inwardly opening slide channel 26 (FIG. 6). The front end of each slide channel 26 is located immediately below the upper margin of the front wall 8 so that the wall 8 in effect blocks the forward end of each channel 26. At their rear ends the slide channels 26 open rearwardly immediately below the lower margins of the rear wind screen 18. The channels 26 support a grill 28 which extends between sidewalls 10 and 12 and forms the bottom of the area enclosed by the wind screens 14 and 16. The grill 28 may be removed from the cabinet 4 by sliding it rearwardly in its slide channels 26.

The upper surface of the grill 28 is substantially flush with a front ledge or shelf 30 which projects forwardly beyond the front wall 8. The shelf 30 is attached to a vertical mounting panel 32 (FIG. 5) which is fastened against the forward face of the front wall 8 by a pair of stud bolts 34.

The stud bolts 34 project through the front wall 8, and at their inner ends they secure the forward end of a grease tray 36 (FIGS. 3–6) against the front wall 8. The grease tray 36 slopes downwardly toward the rear of the cabinet 4 and possesses a stepped configuration, the step being formed by a generally vertical intermediate segment 38. The sides of the tray 36 are attached by self-tapping screws to a pair of brackets 39 (FIGS. 3 and 5), which are welded to the sidewalls 10 and 12. To the rear of the segment 38 the tray 36 not only slopes downwardly, but also slopes toward the center and terminates at a discharge spout 40 which projects beyond the rear flanges 16 on the sidewalls 10 and 12.

The cabinet 4 further includes a removable access panel 42 (FIGS. 2, 3 and 5) which covers and encloses the space between the rear wind screen 18 and the bottom panel 20. In particular, the access panel 42 includes a pair of vertical ribs 44 which turn inwardly from the side margins thereof and are normally positioned against the flanges 16 extending from the sidewalls 10 and 12. At their lower ends the ribs 44 are provided with downwardly opening cutouts 46 (FIG. 5) which engage pivot pins 48 projecting inwardly from the flanges 16, thereby enabling the access panel 42 to be pivoted away from and thereafter removed entirely from the remaining portion of the cabinet 4. Near its upper end the access panel 42 is provided with an aperture 50 through which the spout 40 on the grease tray 36 projects. The access panel 42 is secured in place by a lock bolt 52 at its upper end, and that lock bolt 52 threads into a tab on a crossmember 54 which extends between the sidewalls 10 and 12 directly beneath the rear end of the grill 28. Accordingly, the crossmember 54 also provides subjacent support for the grill 28. The bolt 52 can only be turned when the proper key is inserted into its outer end, and consequently access to the interior of the cabinet 4 is available only to those who possess the proper key.

Within the interior of the cabinet 4 a gas manifold 60 (FIG. 5) extends transversely along the front wall 8, it being secured thereto by a pair of mounting brackets 62. The manifold 60 supplies a pair of control valves 64, and each valve 64 includes (FIG. 7) a right angle valve body 66 threaded into the manifold 60 at its lower end. The opposite end of each valve body 66 projects away from the front wall 8 toward the intermediate segment 38 of the grease tray 36 and terminates at a bushing 68 having a discharge orifice or jet in it. The quantity of gas issuing from the discharge orifice in the bushing 68 of each valve 64 is controlled by a rotatable valve stem 70 journaled in the valve body 66. Each valve stem 70 is operated by a control knob 72 which is exposed on the exterior of the cabinet directly beneath the shelf 30 thereon. More specifically, each control knob 72 has a reduced shank portion 74 which projects through and is journaled in the front wall 8, and the shank portion 74 has a central bore which loosely receives the control stem 70 of the valve 64 operated by that knob. The fit between the bore of the knob 72 and the stem 70 is such that radial movement of the knob 72 is confined by the journal in the front wall 8 and not by the stem 70. The shank 74 of the knob 72 and the stem 70 of its corresponding valve 64 are connected together by a crosspin 76, access to which can be gained only through the interior of the cabinet 4. Since the stems 70 fit loosely within the shanks 74 of their respective control knobs 72 and since the shanks 74 are confined by the front wall 8, the stems 10 will not bend when the knobs 72 are bumped or otherwise subjected to severe blows. To prevent withdrawal of the control knobs 72 from the front wall 8, each shank 74 has a cotter 77 projecting through and beyond it adjacent to the inwardly presented surface of the wall 8.

The bushings 68 at the rear ends of the valve bodies 66 are disposed within and open into burner feed tubes 78 (FIGS. 3–6) which extend rearwardly and pass through the vertical intermediate wall 38 of the grease tray 36. In this connection, the bushings 68 are smaller in diameter than the inside diameter of the feed tube 78 to enable combustion air to enter the feed tube 78 at the bushings 68 and to mix with the combustible gas in the tubes 78. Beyond the intermediate wall 38 and above the grease tray 36 the tubes 78 turn upwardly, and at their upper ends they terminate at burners 80 into which they discharge. The burners 80 are located directly below the grill 28 and are mounted on a crossmember 82 which is attached at its ends to the sidewalls 10 and 12.

Near the sidewall 10 the manifold 60 turns downwardly and is threaded into the body of a solenoid-type gas shutoff valve 86 (FIG. 6). Combustible gas is supplied to the valve 86 through flexible tubing 88 which is connected to a conventional steel gas cylinder 89 containing a suitable combustible gas. The cylinder 89 rests upon the concrete pad 6 and may be removed from the cabinet 4 through the opening therein which is normally covered by the access panel 42. The solenoid valve 86 may in the alternative be connected to a gas distributor line which enters the interior of the cabinet 4 through the concrete pad 6. The distributor line in turn would connect with some distribution facility such as a large gas cylinder common to many outdoor stoves 2 or else a gas main. The feed tubes 78, manifold 60, and flexible tubing 88 comprise a gas supply conduit for feeding combustible gas to the burners 80.

The solenoid valve 86 includes a normally closed valve element and a coil which lifts the valve element off its seat when energized. The coil of the valve 86 is energized by a dry battery 90 (FIG. 6) mounted on the front wall 8 adjacent to the sidewall 12 by means of a bracket 92. One terminal of the battery 90 is connected to the coil of the solenoid valve 86 through a coin-operated timer switch 94. The circuit in which the switch 92, valve 86 and battery 90 are disposed includes a resistance 94 (FIG. 6) in series between the battery and valve to restrict the flow of current through the coil of the valve 86.

The coin-operated switch 94 (FIGS. 5 and 6) is mounted on the front wall 8 below the control knobs 72 and includes a die cast body 98 having a flat front face 100. At the front face 100 the body 98 projects outwardly in the provision of a peripheral lip 102 (FIG. 8) and to the rear of the lip 102 the body 98 has a series of lugs 104 which also project outwardly. The portion of the switch body 98 defined by the lip 102 fits into a complimentary aperture 106 in the front wall 8 so that the front face 100 is substantially flush with the outwardly presented surface of the front wall 8. When the body 98 is so emplaced the rear of the lip 100 abuts against a backing plate 108 which is attached to the back face of the wall 8 and has its inner margin set slightly inwardly from the margin of the aperture 106 so as to form the abutment for the lip 102. The backing plate 108 has three stud bolts 110 projecting rearwardly from it, and those bolts 110 secure locking clips 112 which retain the switch body 98 in place. In particular, each locking clip 112 has an arm portion 114 provided at one end with an aperture through which one of the bolts 110 fits. At its opposite or inner end the arm 114 merges into a right angle tab 116 through a curved juncture. The depth of the tab 116 on each clip 112 is slightly greater than the distance between the backing plate 108 and the opposed end face on the lug 104.

To install the timing switch 94, its body 98 is maneuvered into the aperture 106 and advanced until the rear face of the lip 102 abuts against the forwardly exposed portion of the backing plate 108. Then the tab 116 on one of the locking clips 112 is inserted at angle between one of the lugs 104 and the backing plate 108. With the tab 116 correctly positioned, the arm 114 on that clip 112 is swung forwardly toward the backing plate 108 and manipulated so that the stud bolt 110 aligns with and fits through the aperture in the arm 114 (FIG. 8). As the arm 114 swings forwardly it pivots about the curved juncture between the arm 114 and the tab 116, and of course, the tab 116 is brought into a position which is closer to being perpendicular to the backing plate 108 and the end face the lug 104. Indeed, when the arm 114 is against the backing plate 108, it will be bowed slightly outwardly intermediate its ends and the tab 116 will be, in effect, wedged between the back face 108 and the opposed end face on the lug 104. The arm 116 is retained in that position by a nut 118 which threads over the stud bolt 110. The other clips 112 are installed on the remaining stud bolts 110 in the same manner, and accordingly the body 98 is wedged against the backing plate 108 at three locations (FIG. 6).

The timer switch 94 has coin slots 120 (FIG. 1) opening outwardly through the front face 100 thereof and also an operating handle 122 which rotates beyond the front face 100. The switch 94 includes a timing mechanism and a pair of switches in series. Both switches must be closed to complete the circuit between the battery 90 and the solenoid valve 86. One of the switches is closed by the handle 122 after a coin has been inserted through one of the slots 120. Once that switch is closed, the timing mechanism may be wound and the other switch closed also. When the timing mechanism runs down, it opens both switches. While the timing mechanism is running it cannot be rewound without inserting another coin through one of the coin slots 120. Timing switches of the foregoing construction are available from the Rhodes Manufacturing Company and are marketed under the trademark MARKTIME.

Coins from the switch 94 drop downwardly and are caught in a coin box 124 which is mounted on the wall 8. The box 124 is removable from the wall 8, but access to it can only be gained by removing the access panel 42.

To use outdoor stove 2 the camper or picnicker inserts the proper amount of coin in one of the coin slots 120 and twists the operating handle 122 in both directions so that both switches within the timer switch 94 are closed and the timing mechanism is wound. This completes the circuit from the battery 90 to the solenoid valve 86, causing the valve 86 to open and allow the combustible gas to flow from the cylinder 89 into the manifold 60. Next each control knob 64 is turned so as to open the control valves 64 and allow the gas to issue from the orifices in bushings 68 thereon. The gas discharged from the orifices enters the lower ends of the burner tubes 78 where it mixes with combustion air at that point. The mixture of air and combustible gas flows through the tubes 78 to the burners 80 where it may be ignited with a match, thus establishing a flame under the grill 28.

Any spillage from cooking utensils heated on the grill 28 or any grease from foods cooked directly on the grill 28 drips onto the grease tray 36, and inasmuch as the tray 36 is inclined the spillage or grease will flow toward the spout 40 through which it flows out of the cabinet 4. Thus grease and spillage will not accumulate in significant quantities in cabinet 4. The inclined grease tray 36 also prevents rain water from accumulating in the cabinet 4, and consequently the stove 2 can be left outdoors without being affected by the weather.

The cabinet 4 encloses the battery 90, timer switch 94, solenoid valve 86, gas cylinder 89, and control valves 64, leaving only the essential operating elements, that is that operating handle 122, coin slots 120, control knobs 72 and burners 80, exposed. Thus, the stove 2 is for all practical purposes tamper proof and can be left unattended at campsites and picnic grounds.

Since the control knobs 72 and the operating handle 122 are located directly beneath the outwardly projecting shelf 30 they are not likely to be bumped or damaged inadvertently. Moreover, even if the knobs 72 are bumped, the valve stems 70 will not be damaged inasmuch as the knobs 72 are journaled in the front wall 8 instead of being supported solely by the stems 70 as is true of most gas appliances.

By reason of the fact that the burner supply tubes 78 terminate within the interior of the cabinet 4, they draw the combustion air from a space which is not affected by variations in wind velocity. Consequently, the flow of combustion air remains constant and correctly proportioned to the flow of the combustible gas through the bushings 68 in the control valves 64. Moreover, the triangular wind screens 14 at the sides of the grill 28 and the rear wind screen 18 at the back of the grill 28 reduce the velocity of any wind across the top of the grill 28 so that the flames at the burners 80 are not adversely affected thereby to any appreciable extent. The wind screens 14 and 18 further enable the heat from the flames at the burners 80 to concentrate directly above the burners instead of being dissipated by the wind.

The grill 28 is easily removed (FIG. 3) merely by unlocking the access panel 42 and withdrawing it from the cabinet 4, and then sliding the grill 28 outwardly in its slide channels 26. Once the grill 28 is removed it is easily cleaned, and likewise so are the burners 80 and the grease tray 36.

In lieu of the battery 90, current for operating the solenoid valve 86 may be supplied by a thermocouple which is continually heated by a small flame. Fuel for the flame is supplied by the gas cylinder 89 or other gas source. Since thermocouples produce relatively low current, the resistance 96 is unnecessary and should be omitted.

This invention is intended to cover all changes and modifications of the example of the invention herein chosen for purposes of the disclosure which do not constitute departures from the spirit and scope of the invention.

We claim:

1. A stove comprising: a cabinet having an opening for providing access to the interior thereof and an access panel normally covering the opening; a slideway on and supported by the cabinet, a grill positioned at the upper end of the cabinet and mounted on and supported by the slideway, the slideway being positioned such that the grill can be withdrawn from the slideway and cabinet through the opening normally covered by the access panel, and the access panel when emplaced on the cabinet extending across the end of the grill and preventing removal thereof; a burner located in the cabinet below the grill; a gas supply conduit leading to the burner for supplying a combustible gas thereto; a shutoff valve in the gas supply conduit; and control means for operating the shutoff valve.

2. A stove according to claim 1 wherein the shutoff valve is a normally closed solenoid valve; and wherein the control means comprises a battery and a coin-operated switch connected between the coil of the solenoid valve and the battery.

3. A stove comprising: a cabinet having walls and a removable access panel for providing access to the interior thereof; a grill at the upper end of and supported by the cabinet; a burner located below the grill; a gas supply conduit leading to the burner for supplying a combustible gas thereto and including a manifold mounted on one wall of the cabinet; a shutoff valve in the gas supply conduit; control means for operating the shutoff valve; a control valve connected with the manifold for varying the flow of combustible gas through the conduit and including a rotatable stem which projects toward the wall on which the manifold is mounted; and a control knob projecting through and journaled in the wall, the knob having a bore which loosely receives the stem so that the knob is confined radially by the wall and not by the stem, the knob being connected to the stem so that the knob and stem rotate in unison.

4. A stove according to claim 3 wherein a shelf projects from the wall of the cabinet through which the knob extends, the shelf being above the knob so as to provide protection for it.

5. A stove comprising: a cabinet having an opening for providing access to the interior thereof and an access panel normally covering the opening, the cabinet being defined by vertical walls, at least some of which have mounting flanges at their lower ends for receiving fastening devices adapted to affix the cabinet to a supporting surface, the flanges turning inwardly so that access to them and to the fastening devices is gained only through the opening normally covered by the access panel; a grill at the upper end of and supported by the cabinet; a burner located below the grill; a gas supply conduit leading to the burner for supplying a combustible gas thereto; a shutoff valve in the gas supply conduit; and control means for operating the shutoff valve.

6. A stove comprising: a cabinet having a removable access panel for providing access to the interior thereof; a grill at the upper end of and supported by the cabinet; a burner located below the grill; a generally continuous member supported by the cabinet below the burner and the grill, the continuous member sloping toward the access panel and terminating at a discharge spout which projects through the access panel, whereby foreign matter and rainwater are collected on the member and discharged from the cabinet at the spout so that the interior of the cabinet below the member remains dry and free of foreign matter; a gas supply conduit leading to the burner for supplying a combustible gas thereto; a shutoff valve in the gas supply conduit; and control means for operating the shutoff valve.

7. A stove according to claim 6 wherein the gas supply conduit extends through the continuous member; and wherein the combustion air for the burners is derived from the interior of the cabinet below the continuous member, whereby the air supply for the burner is not affected by wind conditions prevailing exteriorly of the cabinet.

8. A stove according to claim 7 wherein the cabinet extends upwardly beyond the grill on at least three sides of the grill to reduce the wind velocity across the upper surface of the grill.

* * * * *